United States Patent [19]

Giovannetti et al.

[11] 4,271,023
[45] Jun. 2, 1981

[54] SPIRAL-SHAPED DIALYSIS AND ULTRAFILTER DEVICE, ESPECIALLY FOR EXTRACORPOREAL HAEMODIALYSIS

[75] Inventors: Sergio Giovannetti, Pisa; Giuliano Barsotti, Lido Di Camaiore; Giovanni Donati, Cecigliano Alto, all of Italy

[73] Assignee: Tecnodial, S.P.A., Montevarchi, Italy

[21] Appl. No.: 46,492

[22] Filed: Jun. 7, 1979

Related U.S. Application Data

[63] Continuation of Ser. No. 774,625, Mar. 4, 1977, abandoned.

[51] Int. Cl.³ .............................................. B01D 31/00
[52] U.S. Cl. ............................... 210/321.3; 210/494.1
[58] Field of Search .......... 210/321 A, 321 B, 321 R, 210/433 M, 456, 497.1, 494, 499; 55/16, 158; 422/48

[56] References Cited

U.S. PATENT DOCUMENTS

| 3,060,934 | 10/1962 | Claff et al. ............................ 422/48 |
| 3,469,372 | 9/1969 | Yamauchi et al. ..................... 55/158 |
| 3,489,647 | 1/1970 | Kolobow ............................... 210/22 |
| 3,508,662 | 4/1970 | Miller ................................ 210/321 B |
| 3,709,367 | 1/1973 | Martinez .......................... 210/321 B |
| 3,743,098 | 7/1973 | Martinez .......................... 210/321 B |
| 3,880,759 | 4/1975 | Van Assendelft ................. 210/321 B |
| 3,892,664 | 7/1975 | Van Assendelft ................. 210/321 B |
| 4,035,305 | 7/1977 | Miller et al. ..................... 210/321 B |
| 4,116,841 | 9/1978 | Borsanyi .......................... 210/321 B |
| 4,128,479 | 12/1978 | Malchesky et al. .............. 210/321 B |

OTHER PUBLICATIONS

"Polymetrics Reverse Osmosis", Polymetrics, Inc., San Carlos, Calif., 9/1970.

Primary Examiner—Charles N. Hart
Assistant Examiner—David R. Sadowski
Attorney, Agent, or Firm—Morgan, Finnegan, Pine, Foley & Lee

[57] ABSTRACT

An improved dialyzing and ultrafiltering device is disclosed, for extracorporeal blood dialysis, the main improvement comprising a more efficient connection means, a net for supporting the dialyzing membrane having a rectangular mesh-pattern with the weft threads of the net having an undulated arrangement. Improved means are disclosed for the assemblage of the apparatus and for ensuring reliable sealtightness.

14 Claims, 11 Drawing Figures

SPIRAL-SHAPED DIALYSIS AND ULTRAFILTER DEVICE, ESPECIALLY FOR EXTRACORPOREAL HAEMODIALYSIS

This is a continuation of application Ser. No. 774,625 filed Mar. 4, 1977, abandoned.

This invention relates to a spiral-shaped dialysis and ultrafilter device, especially adapted for extracorporeal haemodialysis. More particularly, this invention relates to a spiral-shaped dialyzing and ultrafiltering device having a low blood content and outstanding clinical performance, which is adapted to be applied to a system for the circulation of the dialyzing solution and monitoring which is commonly, though inaccurately called an artificial kidney. The so-called conventional type, artificial kidney is equipped with a perforation from which the fresh dialyzing solution emerges and in which the device is inserted, a low-capacity container for said solution and systems for heating and thermostatically controlling and pumps circulating and heating the liquid and for discharging the exhausted dialyzing solution.

Specifically, the present invention relates to a dialyzing and ultrafiltering device of the kind referred to above in which the compartment wherein the blood is ultrafiltered or dialyzed is composed of a single tubular membrane of regenerated cellulose in which the blood is caused to flow in the longitudinal direction and is purified and ultrafiltered (ultrafiltration is intended in the clinical meaning, that is the subtraction of water and molecules having a weight below about 20,000). Such a membrane is spirally wound and is flattened like a web in the interstices of a rolled net which acts as a supporting and spacing member.

As is well known there exist at present spiral shaped dialyzing devices of the kind referred to above but all of them exhibit, to a more or less appreciable degree, one or more of the present defects:
a high blood content
likelihood of blood emersion from the extracorporeal circuit due to the defective connection of the fittings to the tubular dialyzing membrane and the blood inlet and outlet tubings;
a very high compulsory ultrafiltration and thus one which cannot be adjusted (it cannot be reduced) for the cases in which such an effect is undesirable;
a low dialytic efficiency;
high bulk and weight and thus difficulty in performing the operations in use, with the inherent problems as to storage, transportation and sterilization.

An object of this invention is to provide a dialyzing and ultrafiltering device of the spiral-shaped kind which is not affected by the above enumerated drawbacks and, more particularly, to provide a device of the kind referred to above for the extracorporeal dialysis, said device being characterized by:
(a) a low blood content
(b) a perfect tightness in the points of connection to the tubular membrane,
(c) a low compulsory ultrafiltration,
(d) a high dialytic efficiency, and,
(e) bulk and weight which are considerably reduced so as to facilitate operability, sterilization, storage and shipping.

These objects are achieved with the spiral-shaped dialyzing and ultrafiltering device of the present invention on account of the improved features of the several component parts, the mode of assemblage and the properties of the several materials which are used.

Such a device comprises as its essential component parts:
a central coil for the spiral winding of the tubular membrane and of the supporting and spacing net,
a device for the inlet and outlet of the blood from the dialyzing chamber, which permits a sealtight and reliable connection with the blood inlet and outlet tubings, and
a containing casing for the above enumerated component parts, which is equipped with a fitting for adaption to the circulation system of the dialyzing solution.

Such essential component parts of the device of this invention will now be described in detail with reference to their preferred embodiments, the relevant advantages being individually pointed out in each case.

The central coil for spirally winding the dialyzing membrane and the supporting and spacing net comprises a central hollow cylindrical body which is partitioned into two chambers by a transverse diaphragm. It has preferably a diameter of 56 millimeters and is terminated at its ends by two planar members in the form of a circular annulus which have a diameter of 91 millimeters, as the preferred measure. The central cylindrical body is equipped with a longitudinal window having a rectangular outline with the longer side in the direction of the height of the body which is intended to receive and hold fast the connection device between the tubular membrane and the blood inlet tubing.

Parallel and adjacent to said window, a closed bottom groove runs longitudinally on the coil body. It is intended for housing along a short run, for example 10 millimeters, the angularly bent initial portion of the supporting and spacing net for the tubular membrane. This does away with the necessity of affixing the net by means of an adhesive tape, contrary to what occurs in the conventional devices of the kind referred to herein and permits space savings to a considerable extent, the assemblage being consequently facilitated.

From the connection device housed in the window referred to above starts the first spiral of the tubular membrane which rests on the supporting net and the latter, in turn, runs starting from said adjoining linear groove.

The two circular annular planar members at the end of the coil are composed of four annular bodies which are connected and held in a plane by the agency of radial rod devices which are regularly distributed in the inter annular spaces and are in equal number in the spaces so provided so as to define wide concentrical slots having a circumferential size which is increased in the radial direction and which ensure a ready circulation of the dialyzing solution as well as an even distribution of same. These planar surfaces, in addition, prevent, at the time of assemblage (coiling the tubular membrane and the net), any displacements in the lateral direction of the spirals of the net and the membrane.

The device for connecting the dialyzing tubular membrane with the blood inlet and outlet tubing is substantially different from all the existing types. It has the task of doing away with the drawback of the ease of unsticking and the consequent loss of blood and the formation of fissures in the dialzying membrane, a fact which also contributes to a rise to blood losses. Finally, the device aims at ensuring an even distribution of the blood within all the parts of the dialyzing compartment.

The difficulty of providing such a device lies, in the first place, in the fact that regenerated cellulose (which is the only material which is suitable for clinical dialysis) cannot be welded with cements and adhesives in any way and is extremely brittle, especially when dry, and is subjected to fissures along folds and can be perforated even as the result of moderate friction. These difficulties are aggravated by the fact that the blood inlet and outlet tubings are cylindrical and have a size which is considerably less than that of the tubular membrane (for example, 4 to 5 millimeters for the blood inlet and outlet tubings, and 10 centimeters for the dialyzing membrane, respectively). The result is that with the devices as heretofore adapted, there are formed at the point of connection a number of folds of the dialyzing membrane, which very likely originate fissures and facilitate in any case, even if no fissures are present, the oozing of blood from the extracorporeal blood compartment. In addition, inasmuch as in all the devices used heretofore the area of the inlet cross-section for the blood (as well as the outlet cross-section) is much more restricted than the width of the flattened dialyzing membrane, two triangular areas are formed (they are laterally oriented relative to the blood stream) in which the blood stagnates and where intradialytic blood clotting can take place, which is a hindrance to the total blood reconstitution on completion of the dialysis run.

The device according to the present invention does away in a complete fashion with these defects. It comprises two parts of stiff plastic material and a gasket of a soft resilient material.

The portion which is intended to be introduced in the initial section (or terminal of the dialyzing tubular membrane indicated in the following by the term "nozzle") is composed of a tubular segment having a circular cross-sectional outline on which the blood inlet or outlet tubing is fastened (also this tubing is circular in cross-section) to the dialyzing compartment, and by a parallelepiped having preferably a height of 130 millimeters and a rectangular base of 10 by 13 millimeters. The segment of circular tubing is connected, at an angle about 45 degrees, midway along of the height of the parallelepiped and is prolonged with a through-bore which is terminated at the opposite side of such a base. On this face a dimple is formed having a semicircular cross-sectional outline, oriented longitudinally and running almost along the entire length and is terminated at about 2 mm from the extreme edges. Such a dimple ensures an even distribution of the blood from its intake into the dialyzing compartment and all along its run, including the portion near the outlet. Such a distribution is made still more regular due to the effect of a certain number of grooves such as 10 grooves which, leaving the central portion free, are grooved at regular intervals towards the ends of the parallelepiped (for example, 5 on each side). The periphery of this parallelepiped (on which rest the two faces of the flattened tubular membrane) has at its base ends a rounded portion and has running along its entire extension a groove having a semicircular cross-section intended partially to house a plastic gasket. The periphery has a length which slightly exceeds the peripheral length of the dialyzing tubular membrane: the latter, instead of being folded, is slightly stretched as the parallelepiped with the nozzle is introduced therein. The formation of creases, which frequently cause blood losses in the conventional devices of this kind, is thus prevented.

Once the gasket has been positioned in the above indicated groove of the parallelepiped body equipped with the nozzle, the body is introduced in the starting and end portions of the tubular membrane. The result is that the membrane is compressed by the gasket against the internal surface of the second portion, or external parallelepiped hollow body of the device for connection to the inlet and outlet tubings for the blood when the nozzle-fitted first parallelepiped body to which the membrane is fastened is introduced in the hollow space of said second body from the side which exhibits the circular-cross-section tube segment.

An alternative to this approach is supplied by the invention with the use of plural gaskets, preferably two of them, of the kind referred to above and which are housed in corresponding grooves peripherally formed on the outside wall of said first parallelepiped body and spaced from one another by a few millimeters.

The second portion of the device which is a container box, is composed of a hollow parallelepiped which has an open face and has on the opposite face a slot, through which the cylindrical segment of the nozzle is caused to pass. The shape and size of such a box are such that its outer periphery closely matches the window of the coil body (and also to the window which is formed also on the body of the external container). The periphery of the hollow portion, conversely, has the shape and the size which are adapted to house the parallelepiped and the nozzle with the gasket and the tubular membrane mounted thereon, and which make a snug fit therewith. The result is that the containing box cause a pressure on the gasket and thus also onto the dialyzing tubular membrane, thus preventing any possible blood oozing. In operation, when a considerable pressure is established in the blood compartment, the parallelepipeds are urged into their respective container boxes and thus ensure a tightness, which is more reliable the greater is the pressure.

As regards the supporting and spacing net of the adjacent spirals of the dialyzing tubular membrane, it should be observed that in the spiral dialyzing devices made heretofore such a net has been differently embodied but, in every case, the nets were extruded or moulded from a plastic material and these cannot, also on account of their method of preparation, fulfill the necessary requirements. None of the nets as used nowadays provides, in a satisfactory manner, the following results:

a minimum contact surface with the dialyzing tubular membrane so as to afford the maximum free surface for the dialytic effects (minimum masking effect), a minimum thickness so as to make possible an extreme reduction of the overall bulk of the device, a minimum hindrance to the blood flow so as to reduce the resistance encountered by the blood when flowing through the membrane (and thus a minimization of the compulsory ultrafiltration proportionally to said resistance), a maximum turbulence of the flow of the dialyzing solution so as to minimize or eliminate the stagnating film of the liquid in contact with the outer walls of the dialyzing membrane (which, as is known, hinders the dialytic exchanges), an minimum spacing of the membrane supporting members in order to reduce the possibility of expansion of the membrane due to the effect of the blood pressure (and thus to reduce the blood content of the device).

The net which is used in the dialyzing and ultrafiltering device of the present invention achieves to a high degree all of these results. The net is obtained by weaving and is composed of meshes of cylindrical polyolefine filaments, more particularly polypropylene having a diameter of 500 microns, and this is a characteristic feature of the invention. The second aspect, which is as much characteristic of the invention, involves the structure of the net which is formed by a warp in which the filaments retain a substantially rectilinear trend, whereas the filling threads (which run parallel to the blood stream) have a regularly waved pattern so as to originate on the two faces of the net, parallel sets of peaks which form the supporting structure for the dialyzing membrane. Such an embodiment is obtained by weaving the net so as to form meshes having a rectangular outline (rather thn a square one) having as the longer side the one which is parallel to the direction of the blood stream. This net which is the most characterizing feature of this invention thus provides a supporting member which does not bar the blood flow in any way, but which, conversely, facilitates the blood stream flow. In addition, the net minimizes the masking effect and greatly facilitates the dialytic exchanges, while establishing a maximum turbulence for the flow of the dialyzing solution due to the presence of closely spaced weirs and permitting, due to the optimum spacing of the supporting points, a minimum possibility of expansion for the dialyzing compartment. The net, moreover, due to its thin thickness (1250 microns) permits the overall bulk of the entire dialyzing and ultra filtering device of this invention to be considerably reduced.

Summing up, such a supporting and spacing net provides, to a considerable extent, the following results:
 a minimum contact surface for the dialyzing membrane,
 a minimum thickness,
 a maximum turbulence for the flow of the dialyzing solution,
 a minimum hindrance to the blood flow and thus a reduced compulsory ultrafiltration,
 a minimum blood content.

The outer casing or container encloses the component parts enumerated above and ensures their stability, thus providing an even flow of the dialyzing solution. The casing comprises a tube having a circular cross-section and an outside diameter which is preferably 9.7 centimeters and the height is preferably 18 centimeters. The tube is open at either end and includes a funnel-shaped surface at one end which is continued by a smaller tube (for example, a tube which is 3.5 centimeters long and has a diameter of 2.2 centimeters). This smaller tube is the inlet of the dialyzing solution and forms the connection for the entire device to the monitoring system (artifical kidney). The smaller tube segment is equipped with two outer gaskets of the "O-ring" type to facilitate connection to the monitoring system.

The container wall contains along almost its entire length a window having a size and a shape identical to that of the window formed through the body of the central coil. This window is intended to house the device for connecting the dialyzing tubular membrane with the blood outlet tube.

The open upper portion of the casing is provided with three screw-thread starts to which a ring is coupled. The ring has the task of preventing the window from spreading out and, consequently, preventing the expansion of the entire casing when, during the operation, a pressure is produced in the interior of the casing which is partly due to the blood and partly to the dialyzing solution.

The thus-mounted casing prevents the coil formed by the tubular dialyzing membrane and by the net from undergoing any deformation during the operation. The casing is also intended to convey upwards the dialyzing solution entering from the funnel-shaped portion. The solution is thus compelled to seep through the meshes of the net thus wetting the outer surface of the membrane. Through the top portion of the casing, which is open but is clamped by the ring screwed thereon, the top plane of the coil emerges and the dialyzing liquor flows.

The dimensions of such a casing or container which are those of the entire dialyzing apparatus the subject of this invention, are much smaller than those of any other device of this kind as embodied heretofore. Such a compactness permits savings of materials, a considerable ease of the procedure of use, an improved sterilization, and easier shipping and storage. This latter storage advantage is particularly appreciable on account of the space shortage in the hospital wards.

Thus, a specific object of the present invention is to provide a dialyzing and ultrafiltering device of the spiral type which is particularly suitable for extracorporeal haemodialysis, said device being characterized in that it comprises, in combination, with an outer container and a central coil for winding the net and tubular dialyzing membrane assembly;

(a) connection means, with the respective outer conduits for blood inlet and the blood outlet conduits, each formed by two members which can be coupled together for clamping in a sealtight manner the initial and the terminal portion of the membrane, with means for the blood inlet and outlet and means for the even distribution of the blood stream, said connection means being capable of being housed in longitudinal windows formed in the body of the inner coil and in said outer container, respectively, (b) means for supporting and spacing the adjacent spirals of the dialyzing membrane which run between said connection means, in the form of a roll of a meshed net having a rectangular pattern, with the long side parallel to the direction of the blood flow, woven of thin threads of a polyolefin in which the warp threads have a substantially rectilinear trend and the weft threads, which are parallel to the blood flow, have a regularly undulating outline so as to form on the two faces of the net parallel sets of cuspids on which said membrane rests, the starting end of the net coil being secured to the body of said central coil.

The preferred embodiments of said means of connection and said means of support and spacing are those already outlined above and which will be shown hereinafter.

The result is thus, as the preferred embodiment of the invention, a device for dialysis and ultrafiltration of the spiral type, particularly for extracorporeal dialysis, characterized in that it comprises:

(a) an outer container of tubular shape open at either end and equipped at one end with three cross-thread starts to which is coupled a containing ring and closed at the opposite end by an arrangement in the form of a funnel which has a lower tubular segment for the inlet of dialyzing solution, equipped with two "O-ring" gaskets for the connection to the monitoring system, the sidewall of said container having along nearly its entire length, a longitudinal window for housing a connection element between the dialyzing membrane and the blood outlet tube, (b) a connection element between the tubular membrane and the blood outlet tube which is formed by a first parallelpiped body to the outer side of which is connected, at half its height, at an angle of 45 degrees, a tubular blood outlet nozzle which is extended by a through-bore through said parallelpiped body and on the inner side of which a longitudinal dimple is formed, having a semicircular cross-section, terminated at a short distance from the two extreme edges of said body and equipped, with the exclusion of the central area, with a certain number of evenly spaced apart semicircular grooves, the length of the peripheral outer part of said parallelepiped body being slightly greater than the peripheral length of the dialyzing membrane, and rounded at the two base ends and having, running through nearly all its length, a semicircular cross-section groove which houses a resilient soft gasket and a second parallelepiped body which forms a containing box for the first body, opened on one of the longitudinal sides and equipped on the opposite closed and planar side with a slot through which the tubular nozzle tubular segment is passed, the outer periphery of the planar portion and of the hollow portion of said parallelepiped being respectively adapted to be housed in the longitudinal window of the container (a) and to receive said first parallelepiped body on which said gasket has been mounted and said tubular membrane, said hollow portion being terminated by a peripheral edge which is equipped on one of its longitudinal sides with semicircular grooves, equal as to their number and size to those of the first parallelepiped body and in alignment with the latter after the two bodies have been assembled together, (c) a central coil formed by a central hollow cylindrical body which is split into two parts by a transverse diaphragm and equipped with a bore for passing a connection element between the tubular membrane and the blood inlet tube identical to the connection element (b) and terminated at its ends by two circular annular planar members formed by four solid annular bodies connected and maintained on a plane by rodlike radial supporting members, regularly spaced apart in the interannular spaces and in equal number in each of said spaces so as define concentric openings having a circumferential dimension which increases in the radial direction, said cylindrical body being equipped along its lateral wall with a longitudinal window for housing said connection element between the tubular membrane and the blood inlet tube, parallel and adjacent to a longitudinal side of which there extends a closed bottom groove intended to receive, along a short path, the initial portion, bent at an angle, of a roll of a supporting and spacing net of the tubular membrane coiled around said coil;

(d) a supporting and spacing net of the adjacent spirals of the dialyzing membrane, wound spirally, comprising a woven rectangular pattern, with the longer side parallel to the direction of blood flow, of cylindrical polypropylene tubes having a diameter of 500 microns in which the warp threads have a substantially rectilinear orientation and the weft threads, parallel to the blood flow, have a regularly undulating trend, with the formation on the two faces of the net of parallel sets of cuspids on which the dialyzing membrane rest and is spirally positioned from the connection element (a) to the connection element (b), in the interstices defined by the net coil anchored at its start end to said longitudinal groove of the lateral wall of the central cylindrical body of the coil.

The invention will now be described with reference to the accompanying drawings which show in detail a preferred embodiment thereof.

Figure 1:
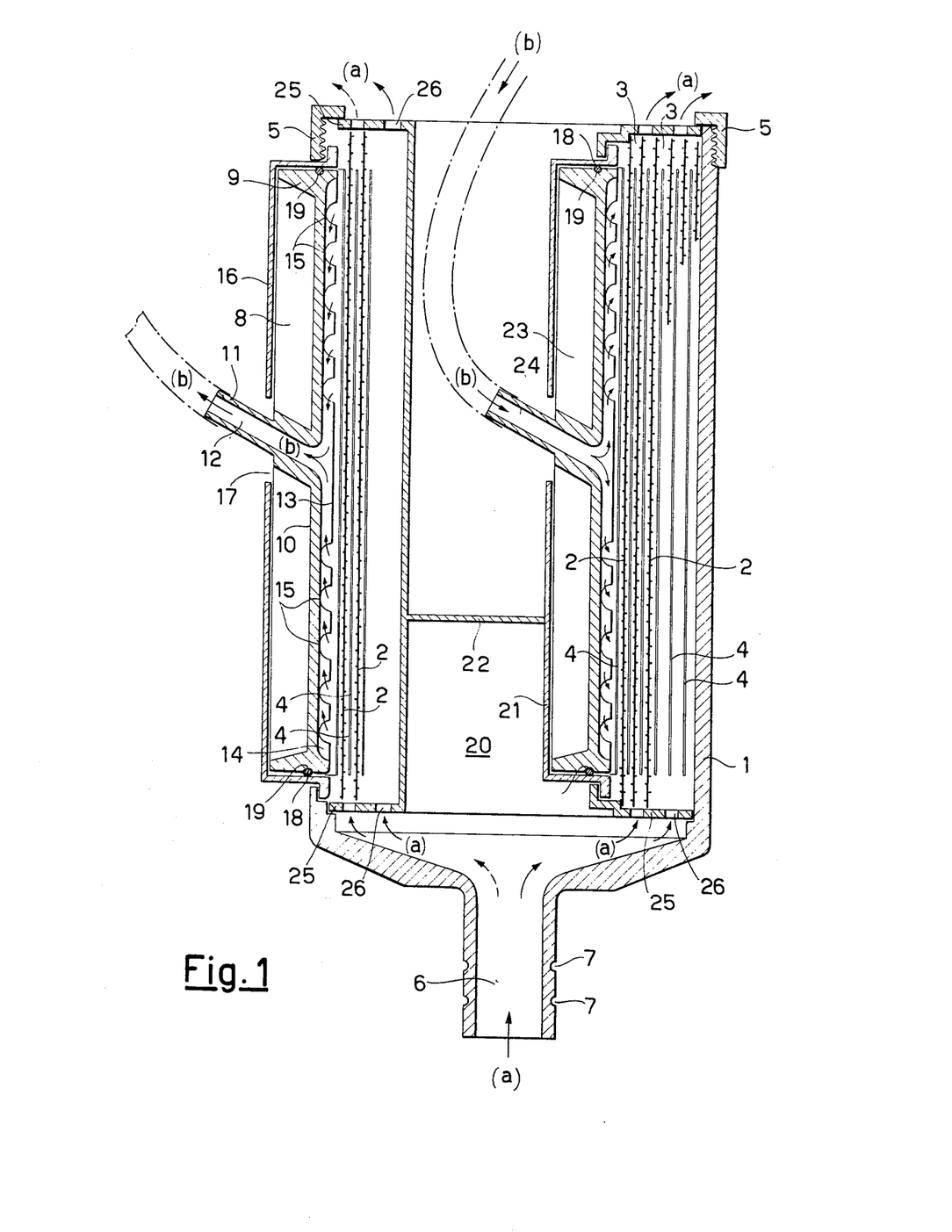
FIG. 1 is a longitudinal cross-sectional view of the dialyzing and ultrafiltering device according to the invention with the elements of connection between the membrane and the inlet and outlet tubes for the blood mounted in their respective housings and the tubular membrane and the supporting and spacing net wound in coiled form in the inside of the container.

Having now particular reference to the FIG. 1 of the accompanying drawings, there can be noticed in it the cylindrical container 1 in the interior of which the net 2 is wound spirally and in the interstices 3 of which there is positioned, spirally, a dialyzing tubular membrane 4 of regenerated cellulose. The container 1 is open at its bottom end and equipped with three screw-thread starts to which is coupled a containing ring 5. The container 1 is closed at the top end by an arrangement in the form of a funnel, which extends into a tubular segment 6 for the inlet of the dialyzing solution. The route of the solution in the interior of the device is indicated by the arrows "a". The tubular segment 6 is equipped with two circumferential grooves 7 for housing two "O-ring" gaskets. In a window formed longitudinally on the sidewall of the container 1 (on the left in the drawing) is housed the element of connection 8 between the tubular membrane 4 and the blood outlet tube. The element comprises a first parallelepiped body 9 to the middle of the outer side 10 of which is connected, at an angle of 45° a tubular nozzle 11 for the outflow of the blood. The nozzle is extended into a throughbore 12 through said parallelepiped body 9 to the inner side 13 on which a longitudinal dimple 14 is formed which has a semicircular cross-section and is terminated at a short distance from the two end edges of the body 9 and is equipped, excluding the central area, with evenly spaced apart semicircular grooves 15, which are in the number of ten, five for each side. The other component part of the connection element 8 is a hollow parallelepiped body 16 having the outer wall closed and having a slot 17 for allowing the passage of the nozzle 11 in the inner space of which is housed the first parallelepiped body 9. In the interior, on one of the longitudinal edges said body 16 has ten grooves which are identical to those of the body 9 and in perfect alignment therewith as the assemblage has been completed. The membrane 4 is inserted between the two bodies 9 and 16 and kept steady with a very satisfactory seal of the gasket 18 housed in a groove 19 which runs longitudinally along the entire outer periphery of the body 9. In the interior of the container 1 can be seen the central coil 20 on which the net and the membrane are wound, exhibiting a central hollow body split into two portions by a transverse diaphragm 22 which has a bore for the passage of the element 23 connecting the tubular membrane with the blood inlet tube entirely identical to the element 8. The hollow body 21 is terminated at the two ends by two planar members 25 having the shape of circular annuli formed by solid annular bodies connected by radial supporting members which define concentric slots 26 for the flow of the dialyzing fluid. In the container 1 the flow of the blood is indicated by the arrows "b".

Figure 2:
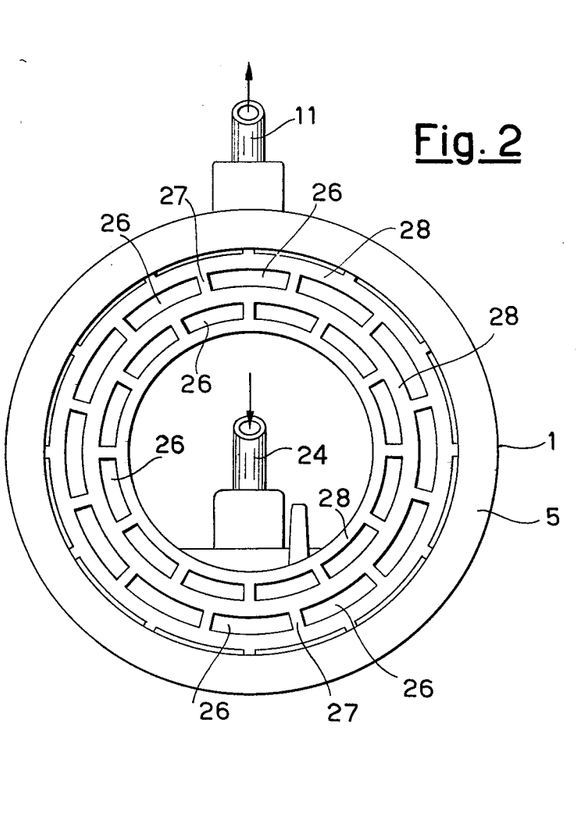
FIG. 2 is a top plan view of the device of FIG. 1.

With reference to FIG. 2 of the drawings there can be seen in detail the nozzles 11 and 24 for the blood inlet and outlet, respectively and the geometrical structure of one of the terminal circular annulus members of the central coil which is housed in the interior of the container 1, in which at 26 are shown the concentric slots for the flow of dialyzing solution and at 27 are shown the rodlike members which connect radially the concentric annular bodies 28.

Figure 3:
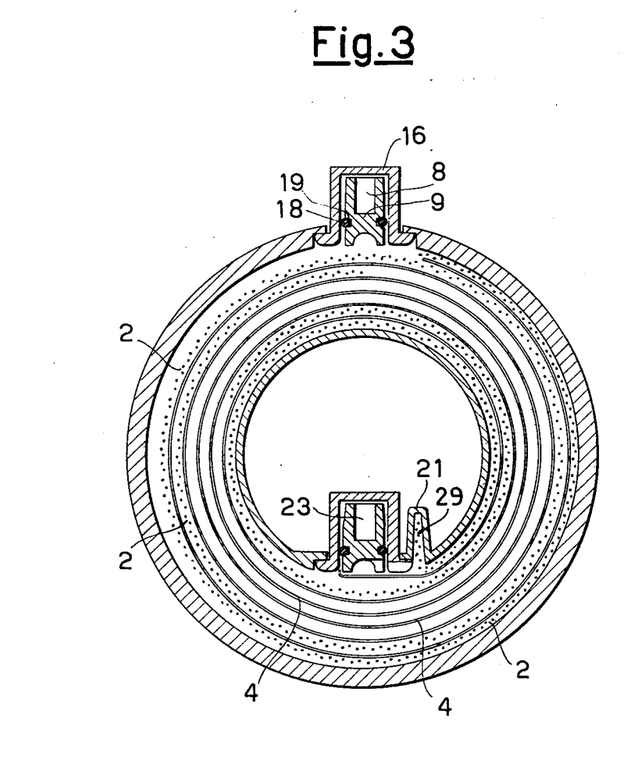
FIG. 3 is a cross-sectional transverse view of the device of FIG. 1.

In FIG. 3 are shown in detail the matching of the net 2 with the central coil along a longitudinal groove 29 as formed on the central body 21 of the coil adjacent to the window which houses the connection element 23 which is entirely identical to the element 8. There can also clearly be seen the spirals of the membrane 4 and the clamping of its ends between the two parallelepiped bodies (9 and 16 for the element 8) of each of the two connection elements with the tight seal provided by the gasket 18 as applied to the groove 19.

Figure 4:
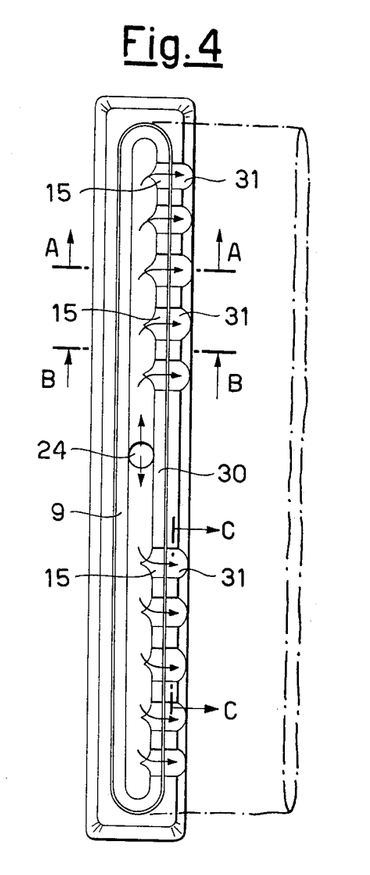
FIG. 4 is a view of the connecting device between the dialyzing membrane and the blood inlet tube on the outlet side for the blood.

FIG. 4 more clearly shows the structure of the connection element 23 (identical to element 8). There can be seen on the inner side (13 in FIG. 1) of the first parallelepiped body 9 a longitudinal dimple 14 which is rounded at its end and shows on one of its edges (the right-hand one in the drawing) ten semicircular grooves 15, evenly spaced apart and subdivided into two groups of five above and below a solid central zone 30.

The body 9 is mounted in the internal hollow space of the outer parallelepiped body 16, the longitudinal right edge of which has grooves 31 identical to the grooves 15 and in alignment with the latter.

Figure 5A:
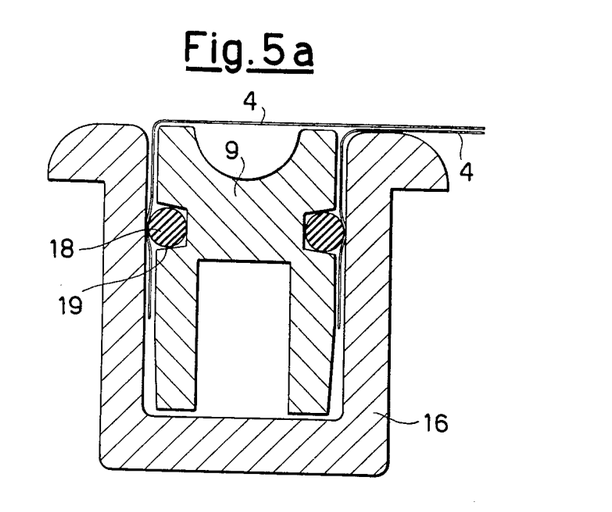
FIGS. 5a and 5b are cross-sectional views of the device of FIG. 4 taken along the lines A—A and B—B.
Figure 5B:
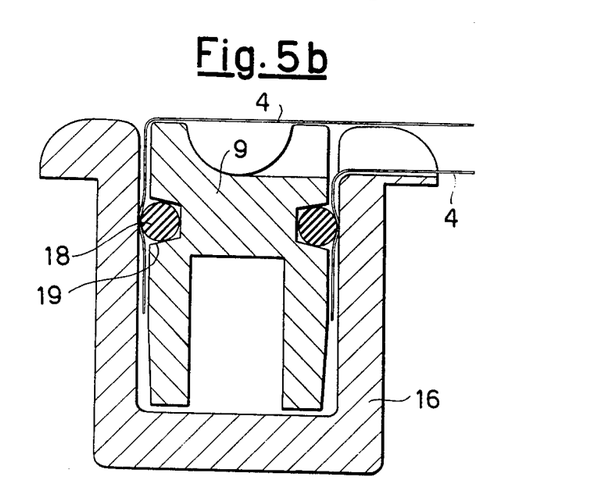
Figure 5C:
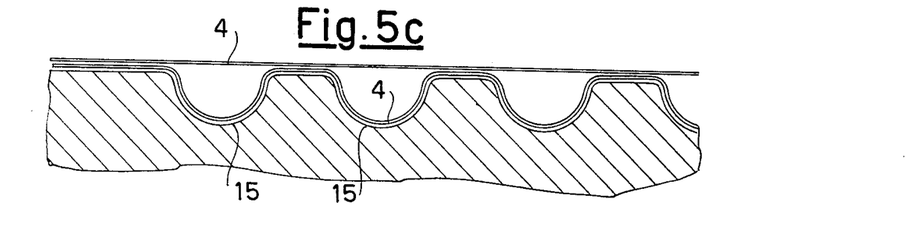
FIG. 5c is a partial longitudinal cross-sectional view of the device of FIG. 4 taken along the line C—C.

In FIGS. 5a and 5b can be seen the clamping of the membrane 4 between the parallelepiped bodies 16 and 9 and the tight seal provided by the gasket 18 which is housed in the groove 19. It should be noticed that the distance between the two edges of the membrane 4 is at a minimum, and becomes nearly zero, in correspondence with the solid portions (FIG. 5a) and is greater in correspondence with the portions with grooves (FIG. 5b) of edges of the parallelepiped bodies 9 and 16. Such a condition is still more conspicuously shown in FIG. 5c.

Figure 6:
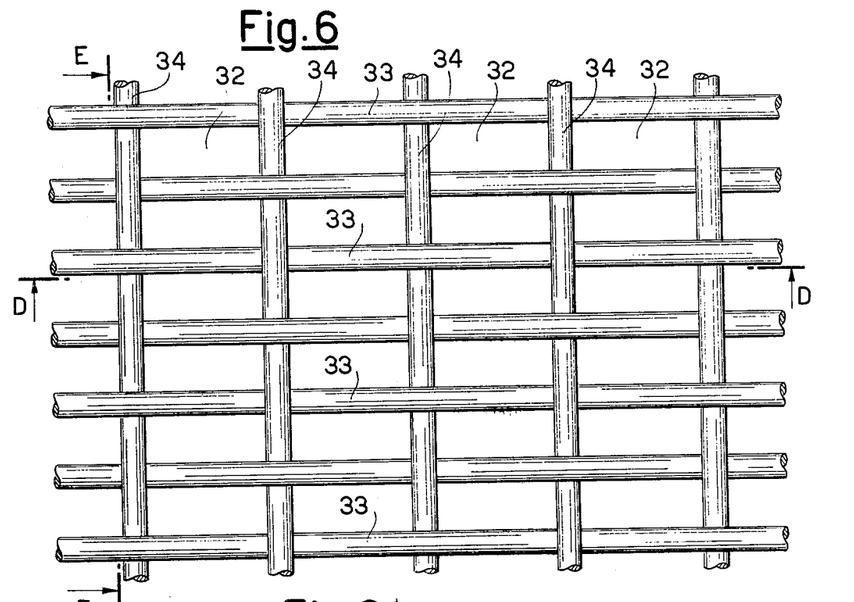
FIG. 6 is a plan view of a portion of the supporting and spacing net of the membrane spirals.
Figures 6A, 6B, 7:
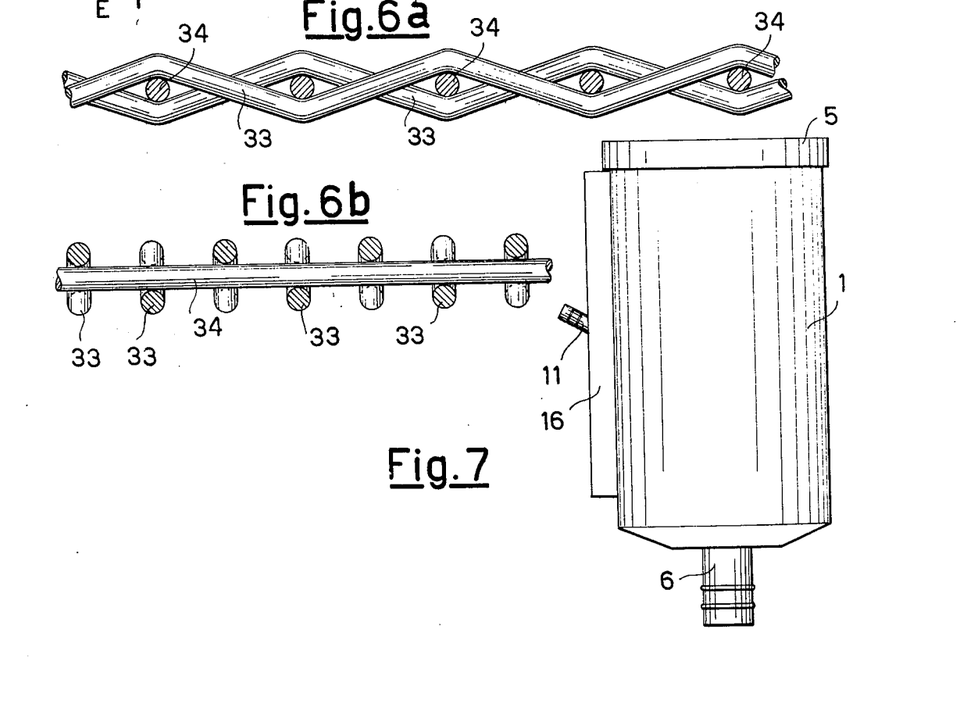
FIGS. 6a and 6b are cross-sectional views of the net of FIG. 6 taken, respectively, longitudinally along the line D—D and transversely along the line E—E.
FIG. 7 is a perspective view of the outer portion of the device of this invention ready for its insertion in the extracorporeal circuit.

In FIG. 6 can be seen a portion of the net according to the invention, with rectangular meshes 32 with the longer side 33 of the rectangles parallel to the blood stream and regularly undulated and the shorter side 34 is rectilinear as best seen in FIGS. 6a and 6b.

Lastly, in FIG. 7 there is a perspective view from the outside of the device of the invention enclosed in the container 1 on which the retaining ring 5 has already been tightened, in readiness for use. There can be seen at the outside the nozzle 11 for the blood outlet and the tubular segment 6 for the intake of the dialyzing solution.

This invention has been described with particular reference to a few particular embodiments but it is understood that modifications and changes can be introduced therein without departing from the scope of the invention.

We claim:

1. A dialyzing and ultrafiltering device of the spiral type for extracorporeal dialysis having an outer container and a removable central coil for winding the tubular dialyzing membrane, comprising:

an inlet and an outlet conduit for blood from the container;

connecting means for connecting said membrane to said inlet and outlet conduits, said connection means for the inlet conduit being housed in a longitudinal window formed in the body of the central coil and said connecting means for the outlet conduit being slidably receivable by a longitudinal window in the opposite external wall of the outer container away from the window formed in the coil, each connecting means including two elements adapted to be coupled together to form a seal between one end of the membrane and the respective conduit, said connecting means further including means for effecting even distribution of blood flow; and means for supporting and spacing the adjacent spirals of the dialyzing membrane running between the two connecting means, said supporting and spacing means comprising a woven mesh net in rolled form, said net being in a rectangular pattern woven one-over and one-under with the longer sides of said rectangles being parallel to the direction of blood flow to increase turbulence in the flow of the dialyzing fluid and minimize hindrance to the blood flow, the initial end of said net being anchored to the central coil.

2. A device in accordance with claim 1, wherein the two elements adapted to be coupled in each connecting means comprise a first parallelepiped body, the peripheral length of which slightly exceeds the peripheral length of the end of the tubular dialyzing membrane, having on its external side a nozzle for connection to one of said conduits, and a second parallelepiped body having a box-like shape open on one side with an inner hollow space for housing the first parallelepiped body and equipped on the opposite side, which is closed and planar, with a slot for receipt of said nozzle, an end of the membrane being clamped and flattened between the outer lateral wall of said first body, which is inserted in one end of the membrane, and the inner lateral wall of said hollow space of the second body.

3. A device according to claim 2, wherein said outer peripheral portion of said first parallelepiped body has, running therethrough along its entire length, one or more grooves with circular cross-section in which are housed one or more soft gaskets of plastic material.

4. A device according to claim 2, wherein on the inner side of said first parallelepiped body a longitudinal dimple is formed having a semi-circular cross-section and which is terminated at a short distance from the two outer borders of said body, rounded at both ends and in the central zone of which a through-bore is formed through said body and extending into said nozzle.

5. A device according to claim 2, wherein said central body of the coil, subdivided into two parts by a transverse diaphragm and equipped with a through-bore for the connection element, is terminated at its top and bottom ends with two planar elements in the form of a circular annulus equipped with slots for permitting the flow therethrough of the dialyzing solution.

6. A device according to claim 2, wherein said outer container has at one end three screw-thread starts and a container ring adapted to be fitted thereon.

7. A device according to claim 2, wherein said tubular dialyzing membrane is made of regenerated cellulose.

8. A device according to claim 2, wherein said container, said connection elements and said central coil comprise a stiff plastic material.

9. A device according to claim 8, wherein said material is stiff polystyrene.

10. A device according to claim 8, wherein the polyolefin of which the net is made is polypropylene.

11. A device according to claim 2, wherein the net comprises cylindrical threads of polypropylene having a diameter of 500 microns and said net has a thickness of 1500 microns.

12. A device according to claim 2, wherein on the two faces of the net there are parallel sets of cuspids on which the spirally wound dialyzing membrane rests in the interstices of the roll of said net.

13. A dialyzing and ultrafiltering device of the spiral type for extracorporeal dialysis having an outer container and a removable central coil for winding the tubular dialyzing membrane, comprising:

an inlet and an outlet conduit for blood from the container:

connecting means for connecting said membrane to said inlet and outlet conduits, said connection means for the inlet conduit being housed in a longitudinal window formed in the body of the central coil and said connecting means for the outlet conduit being slidably receivable by a longitudinal window in the opposite external wall of the outer container away from the window formed in the coil, each connecting means including two elements adapted to be coupled together to form a seal between one end of the membrane and the respective conduit, said two elements adapted to be coupled in each connecting means comprise a first parallelepiped body, the peripheral length of which slightly exceeds the peripheral length of the end of the tubular dialyzing membrane, having on its external side a nozzle for connection to one of said conduits, said outer peripheral portion of said first parallelepiped body has, running therethrough along its entire length, one or more grooves with circular cross-section in which are housed one or more grooves with circular cross-section in which are housed one or more soft gaskets of plastic material, the inner side of said first parallelepiped body having formed thereon a longitudinal dimple having a semi-circular cross-section and which is terminated at a short distance from the two outer borders of said body, rounded at both ends and in the central zone of which a through-bore is formed through said body and extending into said nozzle, and a second parallelepiped body having a box-like shape open on one side with an inner hollow space for housing the first parallelepiped body and equipped on the opposite side, which is closed and planar, with a slot for receipt of said nozzle, and said second parallelepiped body exhibiting, in its turn, along one of its longitudinal borders, an equal number of cuts evenly spaced apart and distributed in the same manner and aligned with said first named cuts when the mutual coupling of the two bodies has been completed, an end of the membrane being clamped and flattened between the outer lateral wall of said first body, which is inserted in one end of the membrane, and the inner lateral wall of said hollow space of the second body, said connecting means further including means for effecting even distribution of blood flow; to the end of a uniform distribution of the blood flow said dimple is equipped on one of its longitudinal borders, excluding the central area, with a certain number of cuts above and below said central area, and means for supporting and spacing the adjacent spirals of the dialyzing membrane running between the two connecting means, said supporting and spacing means comprising a woven mesh net in rolled form, said net being in a rectangular pattern woven one-over and one-under with the longer sides of said rectangles being parallel to the direction of blood flow to increase turbulence in the flow of the dialyzing fluid and minimize hindrance to the blood flow, the initial end of said net being anchored to the central coil.

14. A dialyzing and ultrafiltering device of the spiral type for extracorporeal dialysis having an outer container and a removable central coil for winding the tubular dialyzing membrane, comprising:

an inlet and an outlet conduit for blood from the container;

connecting means for connecting said membrane to said inlet and outlet conduits, said connection means for the inlet conduit being housed in a longitudinal window formed in the body of the central coil and said connecting means for the outlet conduit being slidably receivable by a longitudinal window in the opposite external wall of the outer container away from the window formed in the coil, each connecting means including two elements adapted to be coupled together to form a seal between one end of the membrane and the respective conduit, said two elements adapted to be coupled in each connecting means comprise a first parallelepiped body, the peripheral length of which slightly exceeds the peripheral length of the end of the tubular dialyzing membrane, having on its external side a nozzle for connection to one of said conduits, and a second parallelepiped body having a box-like shape open on one side with an inner hollow space for housing the first parallelepiped body and equipped on the opposite side, which is closed and planar, with a slot for receipt of said nozzle, an end of the membrane being clamped and flattened between the outer lateral wall of said first body, which is inserted in one end of the membrane, and the inner lateral wall of said hollow space of the second body, said connecting means further including means for effecting even distribution of blood flow;

said central body of the coil, subdivided into two parts by a transverse diaphragm and equipped with a through-bore for the connection element, is terminated at its top and bottom ends with two planar elements in the form of a circular annulus equipped with slots for permitting the flow therethrough of the dialyzing solution, said planar circular-annular elements being formed by solid annular bodies which are connected and maintained in planar condition by radial rodlike supporting members, which are regularly spaced apart in the inter-annular spaces and in equal number in each of these spaces so as to define concentrical slots for the flow of the dialyzing solution, the slots having a radially increasing length; and means for supporting and spacing the adjacent spirals of the dialyzing membrane running between the two connecting means, said supporting and spacing means comprising a woven mesh net in rolled form, said net being in a rectangular pattern woven one-over and one-under with the longer sides of said rectangles being parallel to the direction of blood flow to increase turbulence in the flow of the dialyzing fluid and minimize hindrance to the blood flow, the initial end of said net being anchored to the central coil.

* * * * *